(12) United States Patent
Sobonya et al.

(10) Patent No.: US 6,911,406 B2
(45) Date of Patent: Jun. 28, 2005

(54) COMPOSITE SHEET MATERIAL

(75) Inventors: William A. Sobonya, Valley View, OH (US); Elizabeth A. Flores, Sheffield Lake, OH (US)

(73) Assignee: Henkel Consumer Adhesives, Inc., Avon, OH (US)

(*) Notice: Subject to any disclaimer, the term of this patent is extended or adjusted under 35 U.S.C. 154(b) by 16 days.

(21) Appl. No.: 09/891,568

(22) Filed: Jun. 26, 2001

(65) Prior Publication Data

US 2002/0197922 A1 Dec. 26, 2002

(51) Int. Cl.[7] .......................... B32B 27/12; B32B 27/04
(52) U.S. Cl. .............................. 442/43; 442/2; 442/20; 442/22; 442/30; 442/38; 442/40; 442/49; 442/50; 442/54; 442/55; 442/56; 442/58
(58) Field of Search .................... 442/2, 20, 22, 442/30, 38, 40, 43, 49, 50, 54, 55, 56, 58

(56) References Cited

U.S. PATENT DOCUMENTS

| | | | |
|---|---|---|---|
| 2,622,039 A | 12/1952 | Bingell .......................... 117/8 |
| 3,360,422 A | 12/1967 | Desch ........................... 161/89 |
| 3,385,751 A * | 5/1968 | Willard et al. ................. 428/94 |
| 3,619,315 A | 11/1971 | Carrack | |
| 3,620,890 A | 11/1971 | Kemmler ....................... 161/6 |
| 3,804,700 A | 4/1974 | Hoey ........................... 161/160 |
| 3,891,487 A | 6/1975 | Hoey ............................ 156/78 |
| 3,911,186 A | 10/1975 | Trotman ....................... 428/137 |
| 3,933,548 A | 1/1976 | Anderson, Jr. et al. ........ 156/78 |
| 4,078,293 A * | 3/1978 | Aine ............................ 29/416 |
| 4,083,324 A * | 4/1978 | Krumweide .................. 118/300 |
| 4,329,386 A | 5/1982 | Samowich ................... 428/196 |
| 4,336,293 A | 6/1982 | Eiden | |
| 4,409,275 A | 10/1983 | Samowich ................... 428/138 |
| 4,533,588 A * | 8/1985 | Kraft ........................... 428/167 |
| 4,828,908 A * | 5/1989 | Park et al. ...................... 442/9 |
| 5,110,843 A * | 5/1992 | Bries et al. ................... 521/159 |
| 5,120,587 A | 6/1992 | McDermott, III et al. ..... 428/40 |
| 5,295,883 A * | 3/1994 | Moran ........................... 441/65 |
| 5,346,278 A * | 9/1994 | Dehondt .................... 297/219.1 |
| 5,536,556 A * | 7/1996 | Juriga .......................... 428/138 |
| 5,707,903 A | 1/1998 | Schottenfeld | |
| 5,854,144 A * | 12/1998 | Hawley ........................ 442/56 |
| 5,863,845 A | 1/1999 | Owen | |
| 5,874,371 A | 2/1999 | Owen ........................... 442/101 |
| 5,994,242 A | 11/1999 | Arthurs | |
| 6,022,617 A | 2/2000 | Calkins ........................ 428/354 |
| 6,130,174 A | 10/2000 | Hawley et al. | |
| 6,159,583 A | 12/2000 | Calkins | |
| 6,187,865 B1 | 2/2001 | Brodeur, Jr. .................. 525/191 |
| 6,221,796 B1 | 4/2001 | Hawley et al. | |
| 6,558,786 B1 | 5/2003 | Jupina | |
| 2002/0099440 A1 | 7/2002 | Schottenfeld | |
| 2002/0145089 A1 * | 10/2002 | Calkins ................... 248/205.3 |
| 2003/0036323 A1 | 2/2003 | Aliabadi | |

FOREIGN PATENT DOCUMENTS

| | | |
|---|---|---|
| EP | 0 967 340 A2 | 12/1999 |
| GB | 2 042 368 A | 9/1980 |

OTHER PUBLICATIONS

Internet document; "Grip Prints tm" from Con–Tact Brand. Copyright 2000 Pliant Solutions Corporation.*
Merriam–Webster's Collegiate Dictionary, Merriam–Webster, Incorporated, 10th Edition, pp. 236 and 653.*
Merriam–Webster's Collegiate Dictionary, Tenth Edition, Merriam–Webster, Incorporated, p. 891.*

* cited by examiner

Primary Examiner—Ula Ruddock
(74) Attorney, Agent, or Firm—Stephen D. Harper; Glenn E. J. Murphy; Daniel S. Ortiz

(57) ABSTRACT

A sheet product is provided which comprises a scrim embedded in a continuous layer of a foamed resin. The sheet material is useful as a drawer liner or a shelf liner and is fabricated without need for lamination of separate layers to a scrim material.

22 Claims, 1 Drawing Sheet

COMPOSITE SHEET MATERIAL

FIELD OF THE INVENTION

The invention relates to a sheet material useful as a drawer liner, shelf liner, appliance underlayment or the like.

BACKGROUND OF THE INVENTION

Sheet materials and in particular, drawer liners and shelf liners have been made utilizing scrim and foamed plastic. One type of shelf liners and drawer liners has been made by providing a foamed plastic coating on an open scrim. The scrim coated with the foamed plastic is porous and has openings, which pass from one surface to the other. To provide a smooth sheet material, a smooth film of a non-foamed plastic is laminated over one surface of the scrim coated with the foamed plastic. The foam plastic coated scrim acts as a non-slip base for the shelf liner or drawer liner. Composite sheet materials of this type are disclosed in U.S. Pat. No. 5,707,903, U.S. Pat. No. 5,863,845, U.S. Pat. No. 5,874,371 and U.S. Pat. No. 6,130,174 the contents of each of which are incorporated herein by reference in their entirety.

A sheet material formed from a scrim and a laminated smooth surface layer is complex to form since it requires that a layer of smooth material be laminated to the scrim which has first been coated with the foamed plastic.

Another type of shelf liner or drawer liner laminate is disclosed in U.S. Pat. No. 5,854,144, the contents of which are incorporated herein by reference in their entirety. In the composite structure, a layer of closed foam plastic is laminated to one surface of a scrim and a smooth film laminated to the opposite side of the scrim.

All of the composite sheet materials described above require lamination of a smooth film to a base structure to form a suitable top surface to the composite sheet.

BRIEF DESCRIPTION OF THE INVENTION

The invention is a composite sheet material useful as a drawer liner or shelf liner which comprises a scrim impregnated with (embedded in) a continuous layer of a foamed resin.

The foamed resin covers at least both surfaces of the sheet of the scrim material. The foamed resin does not have open pores extending from a first side of the scrim to a second side of the scrim. The scrim is preferably completely covered by or encased in the foamed resin.

The surface of the sheet material can be smooth but preferably displays the underlying weave pattern of the scrim.

An attractive decorative effect can be obtained depending upon the weave of the scrim. In addition a decorative effect can be obtained or enhanced by providing a surface which is colored, printed or decorated with a design.

The composite sheet material has particular utility as a covering to protect and/or improve the appearance of a horizontal surface (e.g., a shelf or drawer liner). The top surface of the composite sheet material is preferably water impervious and may be readily wiped clean of dirt and other undesirable residues. Additionally, the horizontal surface is protected against water and the accumulation of crumbs and other debris, due to the complete lack of any open pores. Further, the foamed character of the composite sheet material provides a cushioning effect when objects are placed on it.

A BRIEF DESCRIPTION OF THE DRAWINGS

DETAILED DESCRIPTION OF THE INVENTION

Figure 1:
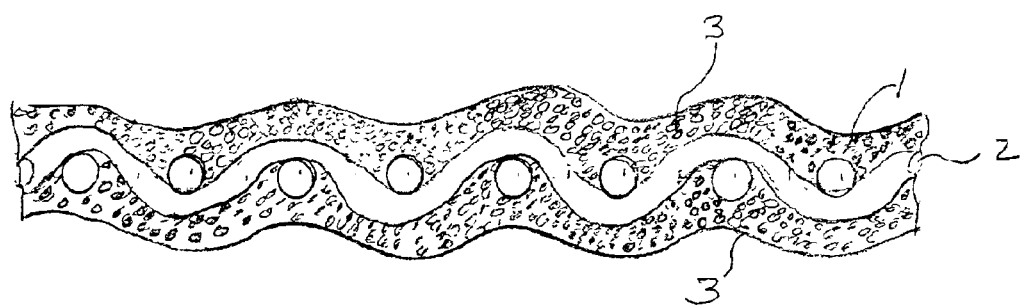
FIG. 1 is a cross sectional view of a plain weave scrim embedded in the foamed resin.

The scrim useful in the practice of the present invention can be formed from natural fibers, synthetic fibers, or mineral fibers. Fibers comprised of cotton, polyester or fiberglass are examples of the fibers which can be utilized to form the scrim of the invention.

The scrim can be woven or non-woven. Preferably, the scrim is a woven scrim having a weave, which provides a decorative effect to at least one surface of the composite sheet. The weave of the scrim must be close enough so that when the scrim is impregnated with the foamable resin composition before foaming, the composition can penetrate into the weave and fill the spaces between the warp and the woof strands and so that when the impregnated composition is foamed no open pores extend from one surface of the sheet material to the opposite surface. The strands can be spun or can be mono-filament. Preferably, the strands are synthetic spun strands and preferably are comprised of polyester.

Preferably, the scrim is woven in a manner which when impregnated with the resin composition and foamed provides a pleasant or decorative surface to the composite sheet material due to the outline of the weave which shows or is telegraphed through the surface of the foamed resin. Weaves such as plain weave, twill weave, herringbone weave, tick weave and the like are simple weaves which can be utilized to form a scrim useful in the practice of the present invention. However, more complex weaves can be utilized to obtain different decorative effects. Many types of weaves provide scrim with a different appearance on opposite surfaces. The two different surfaces can provide different decorative surfaces to the composite sheet material.

As used herein the term continuous coating of foamed resin refers to a coating which does not contain pores which extend from a first surface to an opposite second surface through the foamed resin.

The scrim can be formed from non-woven fibers as long as its fibers are arranged closely enough so that when the resin when impregnated and foamed no open pores extend from one side of the scrim to the other.

In addition to acting as a carrier or support for the foamable resin composition during manufacture and influencing the surface appearance of the composite sheet material, the scrim also functions to increase the tensile strength and tear resistance of the composite sheet material.

If one does not require the decorative surface provided by the outline of the scrim appearing through the foamed resin, the resin can be foamed under constraints which have a leveling or smoothing effect on the surface of the foamed resin in the composite sheet. The foaming of the resin can be constrained by pressing the impregnated scrim against a hot roll or other smooth surface. The resin foams, but contact with the surface constrains the expansion of the foam in the direction of the surface. This provides a composite sheet which has a decorative appearance on a first side due to the uninhibited expansion of the foam and the outline of the scrim which shows therethrough and a second side in which the impression of the scrim showing through the foamed plastic has been substantially reduced to provide a much smoother surface. Either the decorative surface or the much smoother surface can be utilized as the top or the bottom surface of the composite sheet when used as a drawer or shelf liner. Both sides of the composite sheet can be foamed under restraint so that both sides of the composite sheet have a smoother appearance. The smoothness of the sheet when foamed under constraint can range from a surface with few indentations to a surface which approaches the appearance of a surface which has been foamed without constraints. The smoothness of the sheet is related to the smoothness of the surface which is used to control the expansion of the foam and the pressure applied. Another method of providing a smoother surface is to press a surface of the composite sheet against a surface, preferably a smooth surface, before the foam has set. This can be done by pressing a side of hot-foamed composite sheet against a hot or cool surface. When the resin does not require heat to foam, the surface against which the composite sheet is pressed need not be heated. Pressing after foam formation does not provide as smooth a surface as constraint during foaming. If desired, the surface against which the composite sheet is pressed can contain a pattern which becomes embossed in the surface of the composite sheet.

In manufacturing the composite sheet of the invention, the scrim is impregnated with a liquid foamable resin composition. The liquid foamable resin composition can be an emulsion of a foamable composition in water, a solution of the foamable composition in an organic material or a foamable plastisol. The composition must be a liquid which has a viscosity such that the scrim can be impregnated.

The foamable liquid resin composition is applied to the scrim by known means such as dipping, roller coating, spraying, knife coating and the like. The thickness of the foamable resin composition on the surface of the scrim can be controlled by means such as a knife or by passing the impregnated scrim between rollers which are preset at a distance so that excess foamable resin composition is removed. The impregnated scrim material is then passed through a heating zone if heat is required to foam the resin. If the liquid foamable resin composition is an emulsion, the water in the emulsion is first evaporated and further heating causes the resin to foam and set. If the foamable composition is a solution of the foamable resin composition in an organic solvent, the organic solvent is first removed in the heating zone and the resin foamed and set. A preferred material is an organic plastisol, such as a plastisol having a foaming agent incorporated in the composition. Latent foaming agents (i.e., foaming agents which are stable at room temperature but which are activated by heating to an elevated temperature) as well as physical foaming agents (e.g., gases and volatile hydrocarbons or halocarbons) may be employed. The plastisol is impregnated into the scrim and the impregnated scrim is then heated in the heating zone to foam and gel the resin composition. A preferred material is a polyvinyl chloride (PVC) plastisol containing a foaming agent and the usual plasticizers, stabilizers, antioxidants, fillers, pigments, dyes and the like which are generally included in PVC compositions. Foamable polyurethanes may also be utilized and foaming can be accomplished at lower temperatures. Where the composite sheet structure is to be used as a shelf liner or the like, it will generally be advantageous to select a resin for use in impregnating the scrim which will provide a skid-resistant bottom surface on the composite sheet material. The foamed resin thus desirably has a coefficient of friction which is sufficiently high so as to prevent the composite sheet material from sliding on the horizontal surface to which it is applied.

The impregnated scrim is passed through a means which ensures that the proper amount of the foamable resin composition has been applied to the scrim. Means such as knife blades, rolls and the like can be utilized to ensure that excess foamable resin composition is not adhered to the scrim.

If the foamable resin composition is in the form of an emulsion in water, the impregnated scrim is passed through an oven to dry the resin composition and through a heating and foaming zone where the resin composition applied to the scrim is heated to a temperature to activate the foaming agent and foam and gel, cure or polymerize the resin.

The impregnated scrim can be carried through the heating zone on a tenter frame or other means, which provides for foaming the resin composition without hindering the expansion of the foam. In an alternate embodiment, an impregnated scrim can be pressed against a smooth surface to inhibit foam expansion; the smooth surface can be heated to cause the resin composition to foam and gel or polymerize. When the impregnated scrim is pressed against a smooth surface and foamed, the surface of the scrim after foaming becomes much smoother than the surface of the scrim on which foaming was not inhibited. This method permits the formation of a composite material having a relatively smooth surface on a first side and a decorative surface on the second side which reflects the character of the scrim weave. The outline of the scrim carrying through the foam layer can provide an interesting decorative appearance to the composite sheet structure.

FIG. 1 is a cross section of the composite sheet of the invention through the warp and woof of a plain-weave scrim. The warp 1 and the woof 2 are woven in a plain weave pattern to form the scrim. The scrim is impregnated with a foamed resin material 3. As can be seen from FIG. 1, the upper and lower surfaces of the composite structure show the outline of the fibers or yarns forming the scrim.

Figure 2:
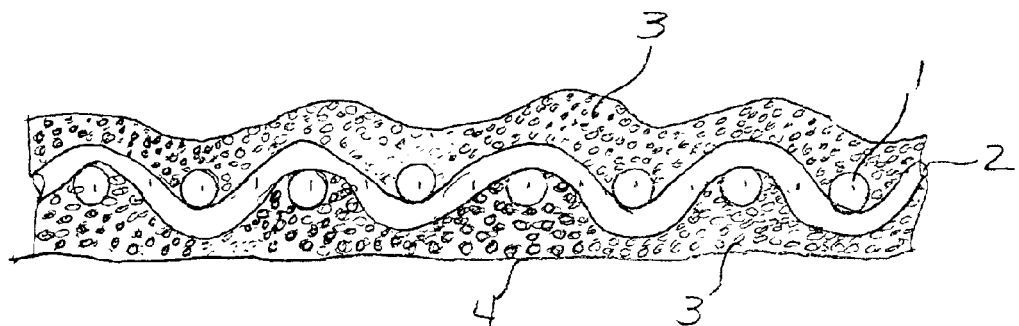
FIG. 2 is a second embodiment of the invention showing a plain weave scrim embedded in the foamed resin wherein one side of the composite sheet is flat

FIG. 2 is a cross section of a composite of the present invention wherein the scrim is a plain weave formed from warp fibers 1 and woof fibers 2. The scrim has been impregnated with a foaming composition and the composition has been foamed to provide a foamed coating 3. As noted, the lower side 4 of the composite structure shown in FIG. 2 is flat. This can be obtained by permitting the resin to foam under conditions in which the expansion of the foam is inhibited. This can also be done by pressing the foam against a smooth surface such as the surface of a heated roll or other smooth surface. The expansion of the foam is inhibited in the direction of the pressing surface and the surface of the composite sheet is more even than the surface of the composite sheet, which has been foamed under conditions in which the expansion of the foam has not been inhibited. In an alternative embodiment, the foam, after formation but before setting, can be pressed against a surface to level the foam. This method does not provide a surface as smooth as can be obtained by restraining the foaming.

The term smooth is utilized to contrast the surface of the composite in which the foaming has been inhibited or pressed before setting with the surface in which the foaming has not been inhibited or pressed before setting. The surface, which has been foamed under conditions in which the foam expansion has been inhibited, can contain small irregularities due to the pressure which may be applied between the composite and the smooth surface. However, these surfaces under which the expansion of the foam has been inhibited displays a lower shadowing or showing through of the outline or pattern of the scrim.

The composite sheet structure of the present invention can have a thickness in the range of from about 45 mils to about 150 mils and preferably from about 55 mils to about 100 mils. The thickness of the composite is dependent upon the nature of the scrim in relation to the weave and thickness, the quantity of foamable resin composition impregnated on the scrim, the type and amount of foaming agent, and to any force which has been applied to inhibit expansion of the foam. In one embodiment of the invention, the thickness of the composite sheet structure and the type of scrim and foamable resin composition employed are selected such that a relatively flexible sheet is obtained which is capable of conforming closely to and gripping a horizontal surface to which the composite sheet structure is applied with little or no curling. In other emodiments, however, a thicker, less flexible composite sheet structure may be more desirable (e.g., where the composite sheet structure is used as a covering for wire shelving).

Decorative patterns or designs may be added to one or both surfaces of the composite sheet structure by printing methods or the like. If desired, one surface of the composite sheet structure may be treated so as to render it more or less slip resistant than the other surface. For example, if a relatively slippery top surface is preferred, a plastic or other resinous material having a lower coefficient of friction than the foamed resin may be applied. Preferably, no adhesive is present on the bottom surface of the composite sheet structure, as this will facilitate lifting and repositioning of the composite sheet structure. At the same time, however, the composite sheet structure may be prevented from sliding around on the horizontal surface during normal use through the selection of a foamed resin having a relatively high coefficient of friction on the bottom surface of the composite sheet structure (i.e., the surface placed in contact with a horizontal surface such as a shelf). The foamed resin may be colored using a suitable pigment or dye.

The foamed resin is preferably flexible, soft and provides non-slip properties to the surface of the composite sheet structure. Preferred resins are foamed polyurethanes and foamed polyvinylchloride plastisols. Thermoplastic as well as thermoset resins may be utilized.

What is claimed is:

1. A composite sheet product comprising a scrim embedded in a continuous coating of a foamed resin, the composite sheet product being capable of conforming to a horizontal surface and having a thickness of from about 45 to about 150 mils.

2. The sheet product of claim 1 wherein the foamed resin is selected from a group consisting of foamed polyvinyl chloride and foamed polyurethane.

3. The sheet product of claim 2 wherein the scrim is woven.

4. The sheet product of claim 2 wherein the scrim is non-woven.

5. The sheet product of claim 2 wherein the foamed resin is a foamed polyvinyl chloride plastisol.

6. The sheet product of claim 2 having a thickness from about 55 to about 100 mils.

7. The sheet product of claim 1 wherein the scrim is woven.

8. The sheet product of claim 1 wherein the scrim is non-woven.

9. The sheet product of claim 1 wherein the scrim comprises at least one member selected from a group consisting of natural fibers, synthetic fibers and mineral fibers.

10. The sheet product of claim 1 wherein the foamed resin is a foamed polyvinyl chloride plastisol.

11. The sheet product of claim 10 having a thickness of from about 55 to about 100 mils.

12. The sheet product of claim 1 having a thickness of from about 55 to about 100 mils.

13. The sheet product of claim 1 wherein at least one side has been smoothed.

14. A combination of a horizontal surface and the composite sheet product of claim 1.

15. The composite sheet product of claim 1 wherein the scrim is formed from spun strands.

16. The composite sheet product of claim 1 wherein the foamed resin comprises a foamed polyvinyl chloride plastisol and the scrim comprises woven polyester.

17. An underlayment comprising the composite sheet product of claim 1.

18. The composite sheet product of claim 1 wherein at least one surface has non-slip properties.

19. The composite sheet product of claim 18 wherein top and bottom surfaces of the composite sheet product have non-slip properties.

20. The composite sheet product of claim 1 wherein no adhesive is present on a bottom surface of the composite sheet product.

21. The composite sheet product of claim 1 having a cushioning effect.

22. The composite sheet product of claim 1 having a top surface which is impervious to water.

* * * * *

UNITED STATES PATENT AND TRADEMARK OFFICE
CERTIFICATE OF CORRECTION

PATENT NO. : 6,911,406 B2
DATED : June 28, 2005
INVENTOR(S) : Sobonya et al.

It is certified that error appears in the above-identified patent and that said Letters Patent is hereby corrected as shown below:

Column 5,
Line 47, after "mils", add -- , wherein the foamed resin is foamed polyvinyl chloride Plastisol. --.

Column 6,
Line 1, cancel claim 2.
Line 8, cancel claim 5.
Line 10, delete "claim 2" and insert -- claim 1 --.
Line 20, cancel claim 10.

Signed and Sealed this

Twenty-first Day of February, 2006

JON W. DUDAS
*Director of the United States Patent and Trademark Office*